(12) United States Patent
Scott et al.

(10) Patent No.: US 8,701,139 B2
(45) Date of Patent: Apr. 15, 2014

(54) SYSTEM AND METHOD TO FACILITATE SELECTION OF EPISODES OF SERIAL PROGRAMS FROM A MEDIA SERVICE

(75) Inventors: Charles Scott, Austin, TX (US); James Cansler, Cedar Park, TX (US); Scott White, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 758 days.

(21) Appl. No.: 12/608,611

(22) Filed: Oct. 29, 2009

(65) Prior Publication Data

US 2011/0107373 A1 May 5, 2011

(51) Int. Cl.
*G06F 3/00* (2006.01)
*G06F 13/00* (2006.01)
*H04N 5/445* (2011.01)

(52) U.S. Cl.
USPC ............................................. 725/40; 725/44

(58) Field of Classification Search
USPC .................................................... 725/40, 44
See application file for complete search history.

(56) References Cited

U.S. PATENT DOCUMENTS

| | | | | |
|---|---|---|---|---|
| 7,861,258 | B2 * | 12/2010 | Barton et al. | 725/28 |
| 7,992,106 | B2 * | 8/2011 | Nelson | 715/854 |
| 8,082,502 | B2 * | 12/2011 | Ijichi et al. | 715/716 |
| 2004/0268403 | A1 * | 12/2004 | Krieger et al. | 725/112 |
| 2006/0136965 | A1 * | 6/2006 | Ellis et al. | 725/46 |
| 2006/0271959 | A1 * | 11/2006 | Jacoby et al. | 725/46 |
| 2007/0005629 | A1 * | 1/2007 | Tokuda et al. | 707/102 |
| 2007/0220114 | A1 | 9/2007 | Kaarela et al. | |
| 2008/0229358 | A1 * | 9/2008 | Van Steenbergen | 725/40 |
| 2008/0253237 | A1 | 10/2008 | Fu | |
| 2012/0047533 | A1 * | 2/2012 | Westberg | 725/46 |

OTHER PUBLICATIONS

"Tips for Podcast Fans," iTunes, <http://www.apple.com/itunes/podcasts/>. Retrieved Sep. 28, 2009, 5 pages.
"Frequently Asked Questions—Zinc," Zinc, <http://www.zeevee.com/zinc/faqs>. Retrieved Sep. 28, 2009, 4 pages.
"Zinc Help," Zinc, <http://www.zeevee.com/zinc/support/help?. Retrieved Sep. 28, 2009, 6 pages.
"How to Automatically Download your Favorite TV shows using uTorrent," Simple Help, <http://www.simplehelp.net/2008/10/06/how-to-automatically-download-your-favorite-tv-shows-using-utorrent/#>. Retrieved Sep. 28, 2009, 10 pages.

(Continued)

*Primary Examiner* — Nnenna Ekpo
(74) *Attorney, Agent, or Firm* — Toler Law Group, PC

(57) ABSTRACT

Systems and methods to facilitate selection of episodes of serial programs from a media service are provided. A particular computer-implemented method includes retrieving a media service favorites list of programs associated with at least one user at a computing device. The media service favorites list includes at least one first serial program selected by at least one user and at least one second serial program selected by a recommendation engine. The method also includes sending from the computing device a display of the media service favorites list to a display device associated with the computing device. The display includes an entry for each of the programs in the media service favorites list and a first selectable indicator associated with each of the serial programs determined to have a new, unviewed episode.

20 Claims, 6 Drawing Sheets

(56) References Cited

OTHER PUBLICATIONS

"What Can You Watch Using Zinc?" Zinc, <http://www.zeevee.com/zinc/whats-on/zinc>. Retrieved Sep. 28, 2009, 2 pages.

"Zinc—Simple Navigation," Zinc, <http://www.zeevee.com/zinc/simple-navigation>. Retrieved Sep. 28, 2009, 2 pages.

"Zinc—Our Free Internet Video Browser," Zinc, <http://www.zeevee.com/zinc>. Retrieved Sep. 28, 2009, 1 page.

\* cited by examiner

SYSTEM AND METHOD TO FACILITATE SELECTION OF EPISODES OF SERIAL PROGRAMS FROM A MEDIA SERVICE

FIELD OF THE DISCLOSURE

The present disclosure is generally related to facilitating selection of episodes of serial programs from a media service such as a video on demand service.

BACKGROUND

Television service providers offer an increasing number of programs via media services, such as a video on demand service. Some of the programs are serial programs (e.g., television series and multi-part specials). The programs may be added to certain media services after broadcast versions of the programs have aired.

To view a program from a media service, a user may go through a process of searching or browsing a catalog of available titles. After finding the title of the program, the user may select the title, authorize purchase of the program, and choose to play the program.

DETAILED DESCRIPTION

Figure 1:
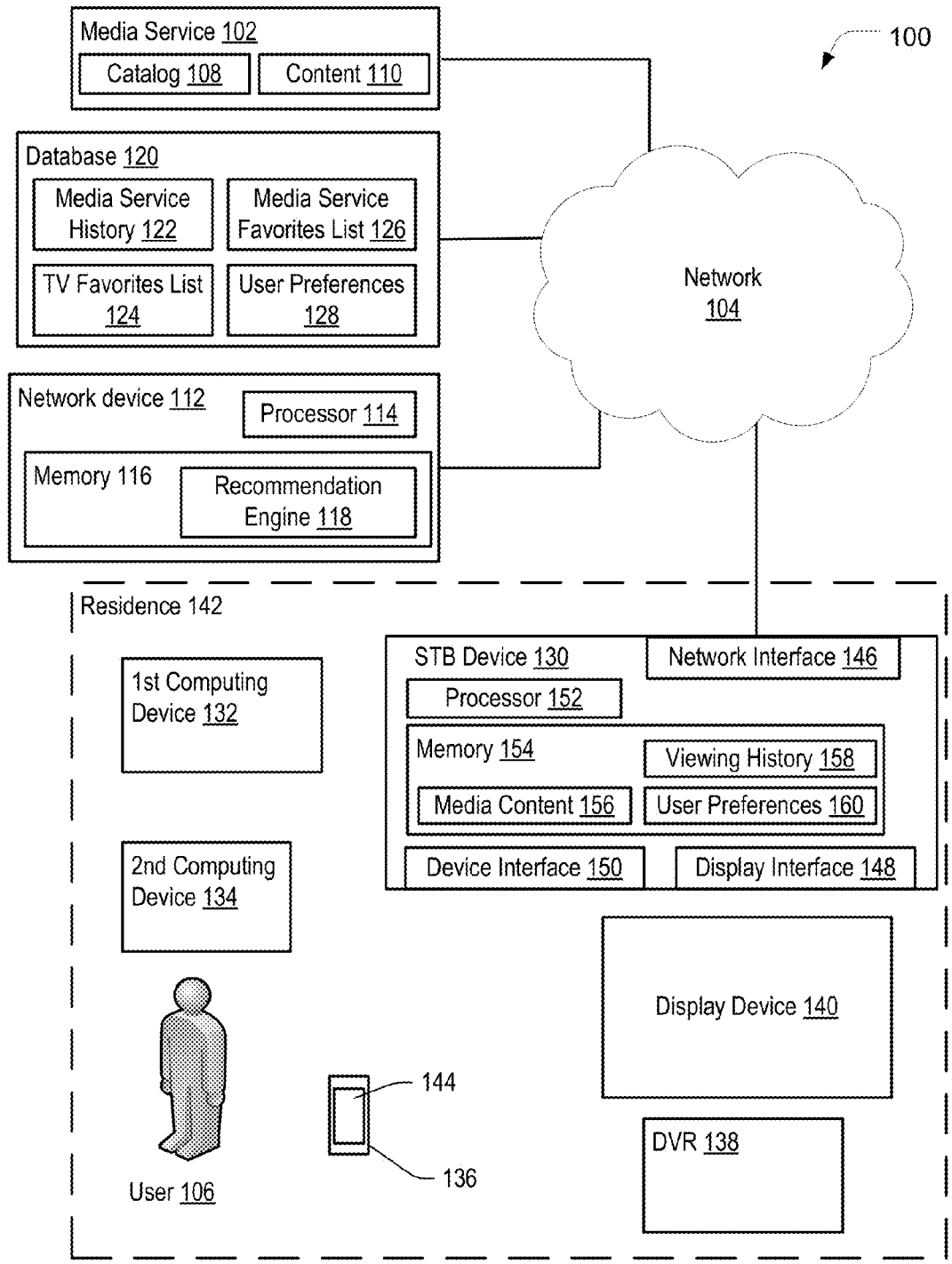
FIG. 1 is a block diagram of a particular embodiment of a system to facilitate selection of episodes of serial programs from a media service.

In a particular embodiment, a computer-implemented method includes retrieving a media service favorites list of programs associated with at least one user at a computing device. The programs in the media service favorites list are available from a media service. The media service favorites list includes at least one first serial program selected by the at least one user and at least one second serial program selected by a recommendation engine. The method includes determining at the computing device whether each serial program in the media service favorites list has a new, unviewed episode available from the media service. The method also includes sending from the computing device a display of the media service favorites list to a display device associated with the computing device. The display includes an entry for each of the programs in the media service favorites list and a first selectable indicator associated with each of the serial programs determined to have a new episode.

In a particular embodiment, a system includes a processor and a processor-readable storage medium coupled to the processor. The processor-readable storage medium includes instructions executable by the processor to receive a request to add a serial program to a media service favorites list of programs from a communication device associated with at least one user. The programs of the media service favorites list are available from a media service. The processor-readable storage medium includes instructions executable by the processor to retrieve the media service favorites list for the at least one user. The processor-readable storage medium includes instructions executable by the processor to add the serial program to the media service favorites list. The processor-readable storage medium includes instructions executable by the processor to send information identifying at least the serial program to a recommendation engine and to receive at least one recommended serial program from the recommendation engine based at least in part on the information identifying at least the serial program. The processor-readable storage medium includes instructions executable by the processor to add the at least one recommended serial program to the media service favorites list when allowed. The processor-readable storage medium includes instructions executable by the processor to determine whether each serial program in the media service favorites list has a new episode. The processor-readable storage medium also includes instructions executable by the processor to send the media service favorites list to the communication device. The media service favorites list includes at least one first program added to the media service favorites list by the at least one user and at least one second program provided from the recommendation engine. Also, each serial program that has a new episode is associated with a new episode indicator.

In a particular embodiment, a computer-readable storage medium includes operational instructions that, when executed by a processor, cause the processor to retrieve a media service favorites list of programs associated with at least one user. The programs in the media service favorites list are available from a media service. The media service favorites list includes at least one first serial program selected by the at least one user and at least one second serial program selected by a recommendation engine. The computer-readable storage medium includes operational instructions that, when executed by the processor, cause the processor to determine whether each serial program in the media service favorites list has a new episode. The computer-readable storage medium also includes operational instructions that, when executed by the processor, cause the processor to send a display to a display device. The display includes an entry for each of the programs in the media service favorites list and a selectable indicator associated with each of the serial programs determined to have a new episode.

Referring to FIG. 1, a block diagram of a particular embodiment of a system to facilitate selection of episodes of serial programs from a media service is illustrated and designated generally 100. The system 100 may include a media service 102 that provides media content through a network 104 to one or more users, such as user 106. The user 106 may subscribe to a multimedia service provider that provides multimedia services to the user 106. The multimedia service provider may provide internet protocol television service, cable television service, satellite television service, telecommunication services, internet access, voice over internet protocol service, other multimedia service, or combinations thereof to the user 106. The multimedia service provider may provide the media service 102 or may facilitate or enable access to the media service 102. Only one user 106 is depicted in FIG. 1, but many more users may have access to the network 104 and to the media service 102.

The media service 102 may include a catalog 108 and content 110. The catalog 108 may include titles of multimedia content that can be delivered to the user 106 from the content 110 of the media service 102. The catalog 108 may include information related to each of the titles. For example, the information for a title may include, but is not limited to, a brief description of the particular content, a list of actors, a genre of the particular content, a release date, ratings and reviews of the content, and a date when the content was added to the media service 102.

Access by the user 106 to the media service 102 may be provided by a network device 112. The network device 112 may provide information and options related to the media service 102, may facilitate authentication of the user 106, may facilitate payment for a desired program, and may request the media service 102 to send acquired media content from the media service 102 to a selected device associated with the user 106.

The network device 112 may include processor 114 and memory 116 accessible to the processor 114. The memory 116 may include a recommendation engine 118. The recommendation engine 118 may include instructions executable by the processor 114 to provide a recommendation of a serial program available from the media service 102 based at least on a serial program selected by the at least one user 106. In some embodiments, the recommendation engine 118 may make a recommendation of a program that is not a serial program in response to receipt of a serial program selected by the at least one user 106. For example, if the user 106 selects the serial program "Glee," the recommendation engine may return the movie title "Frame" as a recommendation.

The network device 112 may be a server of the multimedia service provider, a server associated with the media service 102, a server operated by a third party entity, or combinations thereof. The network device 112 may use information provided from a database 120, from a device associated with the user 106, or from combinations thereof, to provide information and services related to the media service 102. The database 120 may be a separate database as depicted in FIG. 1, or the database 120 may be a part of a memory of the media service 102, the memory 116 of the network device 112, a memory of another device, or combinations thereof.

The database 120 may store information related to users of the media service 102, the multimedia service provider, or combinations thereof. For the user 106, the database 120 may include but is not limited to, a media service history 122, a TV favorites list 124, a media service favorites list 126, and user preferences 128. The media service history 122 may include a list of programs retrieved from the content 110 of the media service 102 by the user 106. The TV favorites list 124 may include a list of user selected television programs available from the media service provider for the user 106. The media service favorites list 126 may include a list of favorite programs that are available from the media service 102 for the user 106. The user preferences 128 may include a list of user specified attributes that may be used by the recommendation engine 118 of the network device 112 when making a serial program recommendation for the user 106. The user preferences 128 may include, but are not limited to, a maximum number of allowed recommended programs in the media service favorites list 126, preferred genres of programs, preferred actors, preferred rating sources, and programs that are not to be included as favorites.

The user 106 may be associated with one or more devices 130-138 capable of receiving media content from the media service provider and the media service 102 through the network 104. In addition to the user 106, other people (e.g., family members, employees, guests, etc.) may also use the one or more devices 130-138 so that at least one user 106 is associated with the one or more devices 130-138. The devices 130-138 associated with the at least one user 106 may include, but are not limited to, a set-top box (STB) device 130, a first computing device 132, a second computing device 134, a third computing device 136, a digital video recorder (DVR) 138, and other devices. The STB device 130 may be coupled to a display device 140 (e.g., a television or a monitor) and the DVR 138. Other users who are able to receive multimedia content may have fewer or more devices. Some devices 130-138 associated with the at least one user 106 may be located in a residence 142 and have access to the network 104. For example, the STB device 130, the first computing device 132 (e.g., a desktop computing system), and the DVR 138 may be located in the residence 142 and have access to the network 104. Some of the devices 130-138 may be portable such that the portable devices can be used in the residence 142 and at other locations to access the network 104. For example, the second computing device 134 (e.g., a laptop computing system) and the third computing device 136 (e.g., a cellular telephone with internet capabilities or a personal digital assistant (PDA)) may be portable devices that the at least one user 106 can use in the residence 142 or at other locations to access the network 104.

Each of the one or more devices 130-138 may include or be coupled to a viewing screen. For example, the STB device 130 and the DVR 138 may be coupled to the display device 140 (e.g., a television display device), the first computing device 132 may be coupled to a computer monitor, the second computing device 134 may include a computer monitor and may be coupled to an external computer monitor, and the third computing device 136 may include a display device 144. At least one input device (e.g., a remote control, a computer mouse, a keyboard, a touch screen, etc.) may be used to provide input to one or more of the devices 130-138.

Each of the one or more devices 130-138 may include a network interface, a display interface, a device interface, a processor, and a memory. For example, the STB device 130 in FIG. 1 may include a network interface 146, a display interface 148, a device interface 150, a processor 152, and a memory 154. The network interfaces of the devices 130-138 may allow the devices 130-138 to send information to the network 104 and to receive information from the network 104. The device interfaces of the devices 130-138 may allow the devices 130-138 to receive input from the user 106, from another of the devices 130-138, or from combinations thereof. For example, the device interface 150 of the STB device 130 may receive input from one or more remote controls, from the DVR 138, or from both. The display interfaces of the devices 130-138 may allow the devices 130-138 to send and receive information from a viewing screen. The processors of the devices 130-138 may execute instructions stored in the memories of the devices 130-138 to send, receive, and manipulate information received from the network interfaces, device interfaces, and the display interfaces. The memories of the devices 130-138 may store instructions to send, receive, and manipulate information. The memories of the devices 130-138 may also store media content, data, applications, and other information. For example, the memory 154 of the STB device 130 in FIG. 1 may include stored media content 156, viewing history 158 of media content sent to the display device 140, and user preferences 160 related to the STB device 130, the DVR 138, and the display device 140.

The user 106 may use a graphical user interface (GUI) displayed on one of the viewing screens associated with one of the devices 130-136 to access the network device 112 through the network 104 to use the media service 102. For example, the user 106 may use a first GUI on the first computing device 132 to send instructions to the network device 112 through the network 104 that result in the first computing device 132 receiving a second GUI that allows the catalog 108 of the media service 102 to be browsed or searched by the user 106. The user 106 may select a title to have the media content associated with the title downloaded from the media service 102 to the first computing device 132 or to another device associated with the user 106 (e.g., to the STB device 130). The network device 112 may cause the media content associated with the selected title to be delivered to one or more devices 130-136 from the content 110 of the media service 102 so that the user can view the media content.

The user 106 may use a GUI displayed on a particular device of the devices 130-136 to access the network device 112 through the network 104 to retrieve the media service favorites list 126 for the user 106. The network device 112 may retrieve the appropriate media service favorites list 126 from the database 120. The processor 114 of the network device 112 may identify serial programs in the media service favorites list 126. For each serial program in the media service favorites list 126 for the user 106, the processor may determine whether a new episode of the serial program has been added to the catalog 108 of the media service 102, whether there are unviewed episodes of the serial program available from the media service 102, whether there are episodes of the serial program that the user 106 has viewed, or combinations thereof. The processor 114 may prepare the media service favorites list 126 for the user 106, including adding the determined information, to be sent to the particular device. The media service favorites list 126 for the user 106 may be sent in a format that the particular device can display via a viewing screen coupled to the particular device, or the media service favorites list 126 for the user 106 can be sent as data that the particular device uses to create a display to be shown on the viewing screen coupled to the particular device. The displayed media service favorites list 126 for the user 106 may include a visual distinction between a program that was selected by the user 106 and a program that was selected by the recommendation engine 118.

The media service favorites list 126 provided to the particular device may include a new episode indicator when any serial program in the media service favorites list 126 has a new episode. A new episode may be an episode that has been added to the catalog 108 within a threshold number of days of a present day (e.g., within 7 days of the present day) and that has not been previously retrieved from the media service 102 by the user 106. The threshold number of days may be a user preference stored in the user preferences 128 of the database 120. A determination of whether the user has retrieved a particular episode that satisfies the threshold number of days may be made by comparing the episode title with episode titles of the serial program that the user 106 has viewed obtained from the media service history 122 of the database 120.

The media service favorites list 126 for the user 106 provided to the particular device may include an unviewed episode indicator when any serial program in the media service favorites list 126 for the user 106 has at least one episode that the user 106 has not retrieved from the media service 102. The media service favorites list 126 for the user 106 provided to the particular device may include a viewed episode indicator when any serial program in the media service favorites list 126 for the user 106 has at least one episode that the user 106 has retrieved from the media service 102. The network device 112 may determine whether to include an unviewed episode indicator, a viewed episode indicator, or both for a serial program in the media service favorites list 126 by comparing the available episodes from the catalog 108 with the episodes in the media service history 122 from the database 120.

When the media service favorites list 126 is displayed on a viewing screen associated with the particular device, the user 106 may select an item from the media service favorites list 126. When the item is a program title, the network device 112 may cause the media content corresponding to the program title to be delivered from the media content 110 of the media service 102 to a destination selected by the user 106. When the item is a new episode indicator for a particular serial program, the network device 112 may determine a title or titles of the new episode or episodes and send the information to the particular device for display to the user 106. The user 106 may select one of the displayed new episode titles to have a particular new episode delivered from the media service 102 to a destination device selected by the user 106. Similarly, the user 106 may have episode titles corresponding to unviewed episodes and viewed episodes displayed by selecting an unviewed episode indicator or a viewed episode indicator.

The user 106 may use a GUI to send a request to the network device 112 to have a selected serial program added to the media service favorites list 126. When the network device 112 receives the request to add the selected serial program to the media service favorites list 126, the network device 112 may retrieve the media service favorites list 126 for the user 106 from the database 120 and add the selected serial program to the media service favorites list 126 when the selected serial program is not already in the media service favorites list 126. The processor 114 of the network device 112 may use the recommendation engine 118 to provide recommendations for one or more other serial programs to add to the media service favorites list 126 based at least in part on the selected serial program. The recommendation engine 118 may determine one or more recommendations based on one or more user preferences 128 of the user 106 obtained from the database 120. In some embodiments, the recommendation engine 118 may examine the media service favorites list 126 for a number of other users who have the selected serial program title identified as a favorite. When a number of these users also identify a first program as a favorite, the recommendation engine 118 may choose the first program as a recommend serial program for the user 106. In some embodiments, the recommendation engine 118 may determine one or more recommendations based on the content of the TV favorites list 124 for the user 106 obtained from the database 120. In some embodiments, the recommendation engine 118 may determine programs that are repeatedly recorded by the user 106 at the DVR 138 and recommend one or more programs that are repeatedly recorded as a recommendation. Titles or other identifying information of programs recorded to the DVR 138 may be obtained from the DVR 138, the STB device 130, or both. Other embodiments may use different criteria for determining recommended programs.

The processor 114 may compare recommendations provided by the recommendation engine 118 with the user preferences 128, the media service favorites list 126, or both to determine which of the recommendations to add to the media service favorites list 126. The processor 114 may automatically add recommendations that are not prohibited by the user preferences 128 or already in the media service favorites list 126 to the media service favorites list 126.

Figure 2:
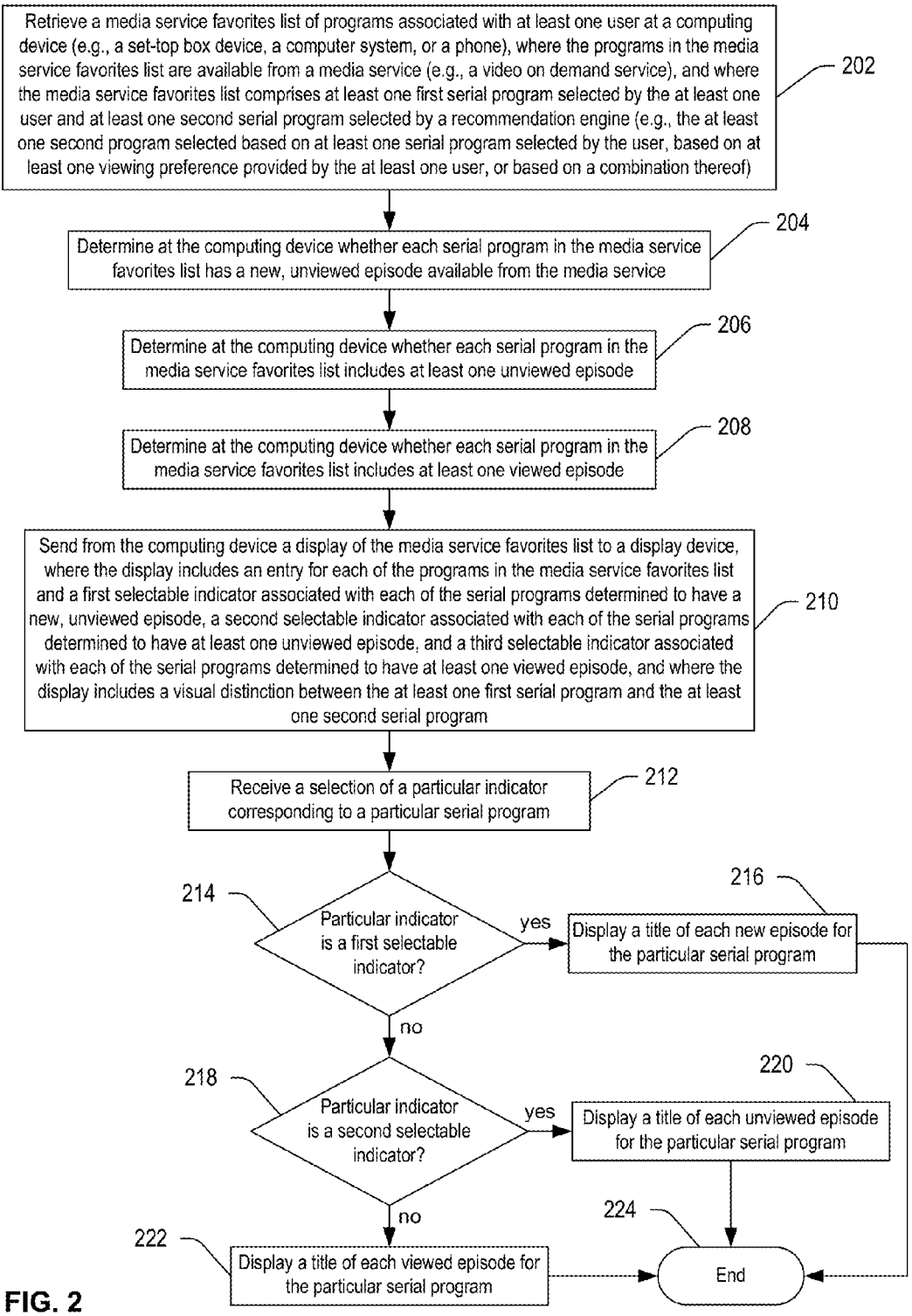
FIG. 2 is a flow diagram of a first particular embodiment of a method to facilitate selection of episodes of serial programs from a media service.

Referring to FIG. 2, a first particular embodiment of a method to facilitate selection of episodes of serial programs from a media service is illustrated. The method may include, at 202, retrieving a media service favorites list of programs associated with at least one user at a computing device. The computing device may be a network device, a STB device, a home computer system, a lap top computer, a phone with the ability to access the internet, a PDA, or other device. The programs in the media service favorites list may be available from a media service, such as a video on demand service. The media service favorites list may include at least one first serial program selected by the at least one user and at least one second serial program selected by a recommendation engine. The at least one second serial program may be selected by the recommendation engine based on at least one serial program selected by the user, based on at least one viewing preference provided by the at least one user, or based on a combination thereof. In a particular embodiment, the media service favorites list may be retrieved from a database (e.g., the database 120 depicted in FIG. 1). In other embodiments, the media service favorites list may be retrieved from a different device (e.g., from the STB device 130 depicted in FIG. 1).

After receiving the media service favorites list of programs, the method may determine at the computing device whether each serial program in the media service favorites list has a new, unviewed episode, at 204. In a particular embodiment, the determination may be made by sending a query to a network device and receiving a result that specifies whether there is at least one new episode that has not been retrieved from the media service for each serial program in the media service favorites list. In other embodiments, the determination may be made by executing instructions using the processor of the computing device to determine whether new episodes exist based on information retrieved from the computing device, network devices, or combinations thereof. The determination of whether an episode of a particular serial program is new may be made by comparing a date when the most recent episode of the particular serial program was added to a media service that provides the serial program to the present date. When the date the episode was added to the media service is equal or less than a threshold number of days, the episode is considered to be a new episode. In some embodiments, the threshold number of days is seven days. In other embodiments, the threshold number of days may be less than or great than seven days. In some embodiments, the threshold number of days may be set by the at least one user. A value of the threshold number of days set by the at least one user may be stored in user preferences associated with the at least one user.

At 206, the computing device may determine whether each serial program in the media service favorites list includes at least one unviewed episode. A user preference may specify whether the unviewed episodes are to be based on only a history of use of the media service or on a history of the use of the media service as well as a viewing history of media content provided by the media content provider to the at least one user. A default setting in the user preferences may be to base the determination of unviewed episodes only on the history of use of the media service.

In a particular embodiment, the determination may be made by sending a query to a network device and receiving a result that specifies whether there is at least one unviewed episode for each serial program in the media service favorites list. In other embodiments, the determination may be made by executing instructions using a processor of the computing device to determine whether unviewed episodes exist based on information retrieved from the computing device, network devices, or combinations thereof. The determination for a particular serial program may be made by retrieving a list of the episodes of the particular serial program that the at least one user has viewed and comparing the list to a list of all episodes of the particular serial program available from the media service. When at least one episode in the list of all episodes does not appear in the list of the episodes of the particular serial program that the at least one user has viewed, there is at least one unviewed episode. The user preferences may include settings that limit the determination to a subset of all available episodes for the particular serial program. For example, a setting in the user preferences may limit the determination to a determination based only a current season of the particular program.

At 208, the computing device may determine whether each serial program in the media service favorites list includes at least one viewed episode. A user preference may specify whether the viewed episodes are to be based on only a history of use of the media service or on a history of the use of the media service as well as a viewing history of media content provided by the media content provider to the at least one user. A default setting in the user preferences may be to base the determination of viewed episodes only on the history of use of the media service.

In a particular embodiment, the determination may be made by sending a query to a network device and receiving a result that specifies whether at least one episode for each serial program in the media service favorites list was viewed. In other embodiments, the determination may be made by executing instructions using a processor of the computing device to determine whether at least one episode was viewed based on information retrieved from the computing device, network devices, or combinations thereof. The determination for a particular serial program may be made by determining whether at least one user associated with the computing device viewed at least one episode of the particular serial program. When at least one episode of the serial program was viewed, there is at least one viewed episode. The user preferences may include settings that limit the determination to a subset of all available episodes for the particular serial program. For example, a setting in the user preferences may limit the determination to a determination based only a current season of the particular program.

At 210, a display of the media service favorites list may be sent from the computing device to a display device. The display device may be a television, computer monitor, viewing screen, or other device coupled to the computing device. The display may include an entry for each of the programs in the media service favorites list. The display may include a first selectable indicator associated with each of the serial programs determined to have a new, unviewed episode. The display may include a second selectable indicator associated with each of the serial programs determined to have at least one unviewed episode. The display may include a third selectable indicator associated with each of the serial programs determined to have at least one viewed episode. The display may also include a visual distinction between the at least one first serial program (i.e., at least one program selected by the at least one user) and the at least one second serial program (i.e., at least one program selected by the recommendation engine).

A selection of a particular indicator corresponding to a particular serial program may be received by the computing device, at 212. At 214, a determination may be made whether the particular indicator is the first selectable indicator (i.e., an indicator associated with new, unviewed episodes). When the particular indicator is the first selectable indicator for the particular serial program, a title of each new, unviewed episode for the particular serial program is displayed, at 216. The method then ends, at 224. When the particular indicator is not the first selectable indicator, the method advances to 218.

At 218, a determination may be made whether the particular indicator is the second selectable indicator (i.e., an indicator associated with unviewed episodes). When the particular indicator is the second selectable indicator for the particular serial program, a title of each unviewed episode for the particular serial program is displayed, at 220. The method then ends, at 224. When the particular indicator is not the second selectable indicator at 218, the particular indicator may be the third selectable indicator (i.e., an indicator associated with viewed episodes). A title of each viewed episode for the particular serial program is displayed, at 222. The method then ends, at 224.

Figure 3:
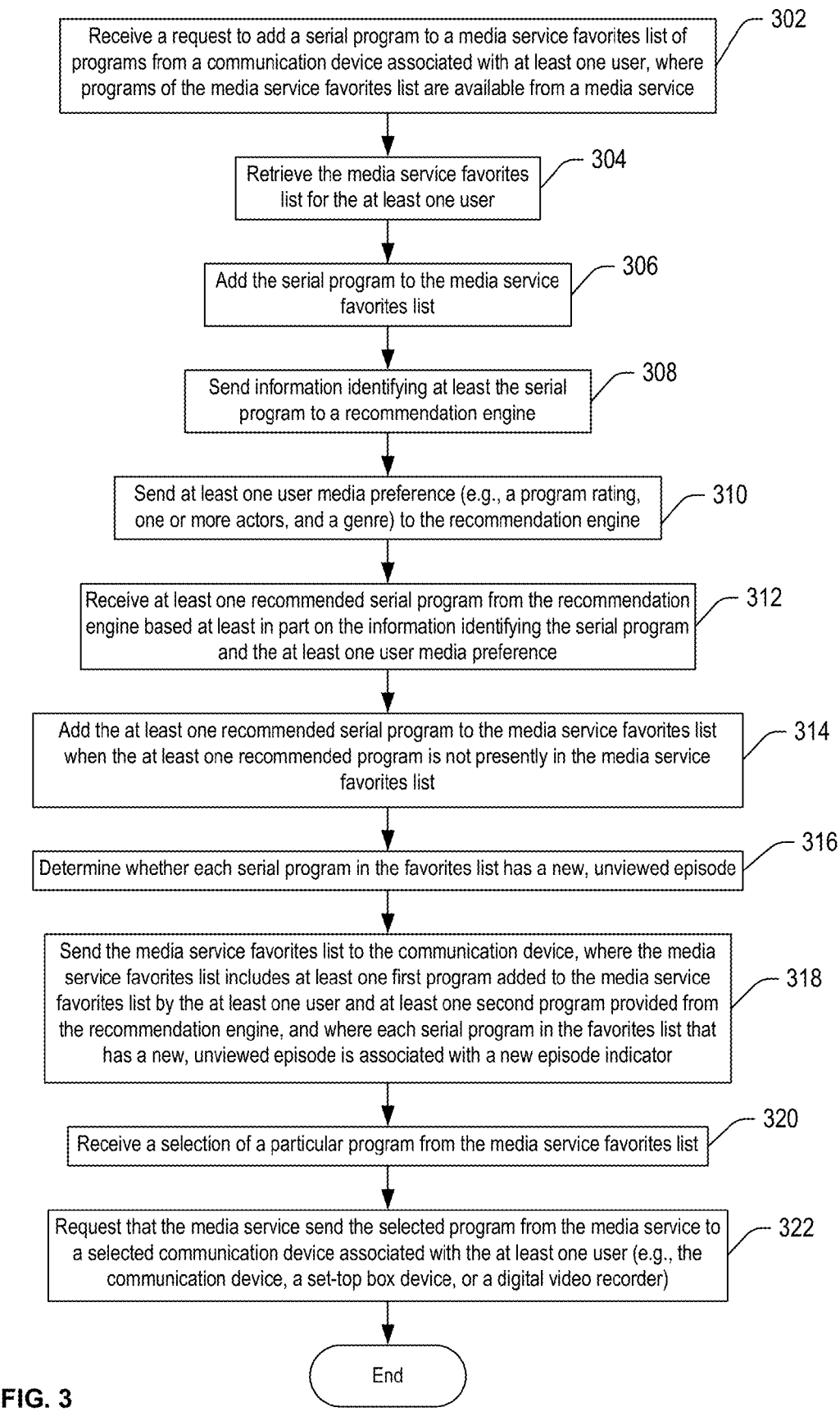
FIG. 3 is a flow diagram of a second particular embodiment of a method to facilitate selection of episodes of serial programs from a media service.

Referring to FIG. 3, a second particular embodiment of a method to facilitate selection of episodes of serial programs from a media service is illustrated. The method may include, at 302, receiving a request to add a serial program to a media service favorites list of programs from a communication device associated with at least one user. The programs of the media service favorites list are available from a media service. In a particular embodiment, the request to add a serial program to the media service favorites list may be received by a network device from a computing device (e.g., the request may be received by the network device 112 depicted in FIG. 1 from the STB device 130, the first computing device 132, the second computing device 134, or the third computing device 136).

At 304, the media service favorites list for the at least one user may be retrieved. The serial program may be added to the media service favorites list, at 306 when the program is not already included in the media service favorites list.

Information identifying at least the serial program may be sent to a recommendation engine, at 308. Also, at least one user media preference may be sent to the recommendation engine, at 310. User media preferences may include, but are not limited to, a program rating from a recommendation source that the program need to satisfy (e.g., the program needs to have at least a three star rating from a particular reviewer), one or more actors that the at least one user prefers to see in a program, one or more actors that the at least one user prefers not to see in a program, genres of programs that the at least one user prefers, genres that the at least one user prefers not to see, other preferences, other limitations, or combinations thereof. The recommendation engine may determine one or more recommended programs. The recommended programs may be based on the serial program, the at least one user preference, other considerations, or combinations thereof. For example, the recommended programs may be programs that other users who have selected the serial program for inclusion in their media service favorites list have selected as favorites.

At 312, at least one recommended serial program may be received from the recommendation engine. The at least one recommended serial program may be based at least in part on the information identifying the serial program and the at least one user media preference. At 314, the at least one recommended serial program may be added to the media service favorites list when the at least one recommended program is not presently in the media service favorites list.

A determination may be made whether each serial program in the favorites list has a new, unviewed episode, at 316. The determination of whether a particular serial program episode is new and unviewed may be made by determining whether the particular serial program episode has been downloaded from the media service for the at least one user, and by determining whether the particular serial program episode is new. Determining that particular serial program episode is new may be achieved by comparing a date when the particular serial program episode of the particular serial program was added to the media service to the present date. When the date that the particular serial program episode was added to the media service satisfies a threshold number of days, the particular serial program episode is considered to be a new episode. In some embodiments, the threshold number of days is seven days. In other embodiments, the threshold number of days may be less than or great than seven days. For example, the threshold number of days may be set to a number of days between scheduled broadcast of new episodes of the serial program. In some embodiments, the threshold number of days may be set by the at least one user. The value of the threshold number of days set by the at least one user may be stored in user preferences associated with the at least one user.

At 318, the media service favorites list may be sent to the communication device. The media service favorites list may include at least one first program added to the media service favorites list by the at least one user and at least one second program provided from the recommendation engine. Each serial program in the favorites list that has a new episode may be associated with a new episode indicator. In an embodiment, the media service favorites list may be sent as data. The communication device may organize the data into a display that is shown on a display device associated with the communication device. In other embodiments, media service favorites list is sent to the communication device in a format that may be sent directly to the display device associated with the communication device.

A selection of a particular program from the media service favorites list may be received from the communication device, at 320. At 322, a request may be sent to the media service to send the selected program from the media service to a selected communication device associated with the at least one user. The selected communication device may be the communication device from which the selection of the particular program was received, or the selected communication device may be a different communication device associated with the at least one user. For example, the selection of the particular program may be received from a cellular phone with an instruction to send the particular program to a STB device, a computer system, or a digital video recorder.

Figure 4:
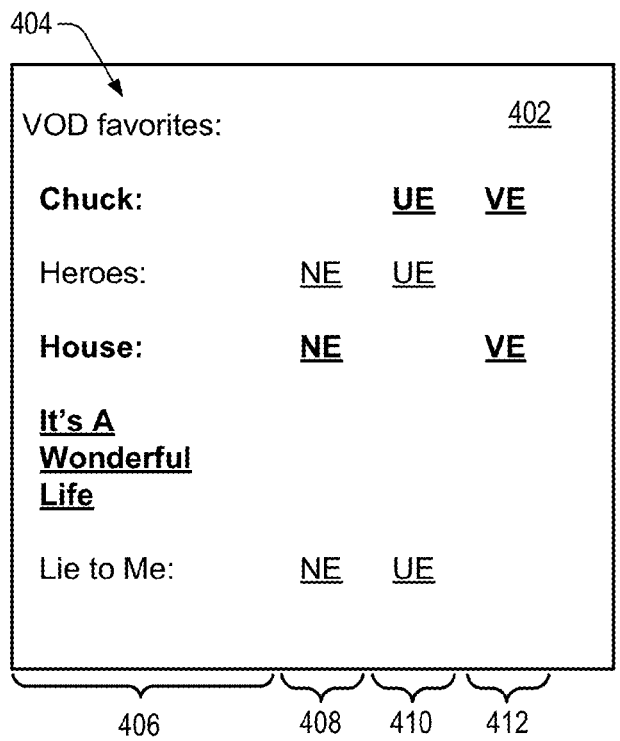
FIG. 4 depicts a first particular embodiment of a display to visually present a media service favorites list.

FIG. 4 depicts a first particular embodiment of a display 402 to visually present a media service favorites list. The display 402 may be sized and include content designed for a particular display device. For example, the display 402 depicted in FIG. 4 may be sized and include content for display on a portable communication device such as a cellular phone or a personal digital assistant (e.g., the display device 144 of the third computing device 136, as depicted in FIG. 1).

The display 402 may include a first title 404 that indicates that the display 402 is related to a media service favorites list. The display 402 may include a list of programs 406 (e.g., including titles, information related to or descriptive of the programs, or both). The list of programs 406 may be displayed alphabetically or in any other desired order. The list of programs 406 may include serial programs and other types of available programs (e.g., movies, sporting events, etc.). Programs in the list of programs 406 that are in the media service favorites list because the programs were selected by at least one user may be visually distinct from programs that are in the media service favorites list because the title was selected by a recommendation engine. The visual distinctions may be, but are not limited to, emphasis styles (e.g., plain text, bold text, underlined text, italicized text, or combinations thereof); particular colors of fonts, backgrounds, or both; particular fonts; or combinations thereof. For example, the titles "Chuck," "House," and "It's A Wonderful Life" in FIG. 4 are shown in bold, which indicates that these titles are in the media service favorites list because the titles were selected by at least one user. Additionally, the titles "Heroes" and "Lie to Me" are shown in plain text in FIG. 4, which indicates that these titles were selected by the recommendation engine. When the list of programs 406 is longer than a height of the display 402, the display 402 may include controls that allow the list of programs 406 to be scrolled to view other portions of the list of programs 406.

The list of programs 406 may include selectable titles and non-selectable titles that are visually distinct. For example, "It's a Wonderful Life" in the list of programs 406 displayed in FIG. 4 is underlined to indicate that the title is selectable. The other entries in the list of program titles 406 displayed in FIG. 4 do not include underlining to indicate that these titles are not selectable. Selection of a selectable title may cause a new screen to be displayed that allows a user to retrieve the selected title from the media service.

The display 402 may include first selectable indicators 408 for serial programs that have a new, unviewed episode. The first selectable indicators 408 may be graphic symbols, text, other indicators, or combinations thereof. In FIG. 4, the first selectable indicators 408 are underlined text "NE." The underlining may indicate that the first selectable indicators 408 are selectable, and the "NE" may stand for "new episodes." Unviewed, new episodes may be episodes that have been added to the media service within a particular time period (e.g., a week) of the present date. In other embodiments, and for other display devices, the first selectable indicator 406 may be different.

The display 402 may include second selectable indicators 410 for serial programs that have episodes that have not been retrieved from the media service by the at least one user. The second selectable indicators 410 may be graphic symbols, text, other indicators, or combinations thereof. In FIG. 4, the second selectable indicators 410 are underlined text "UE." The underlining may indicate that the second selectable indicators 410 are selectable, and the "UE" may stand for "unviewed episodes." In other embodiments, and for other display devices, the second selectable indicator 410 may be different.

The display 402 may include third selectable indicators 412 for serial programs that have episodes that have been retrieved from the media service by the at least one user. The third selectable indicators 412 may be graphic symbols, text, other indicators, or combinations thereof. In FIG. 4, the third selectable indicators 412 are underlined text "VE." The underlining may indicate that the third selectable indicators 412 are selectable, and the "VE" may stand for "viewed episodes." In other embodiments, and for other display devices, the third selectable indicator 412 may be different.

Figure 5:
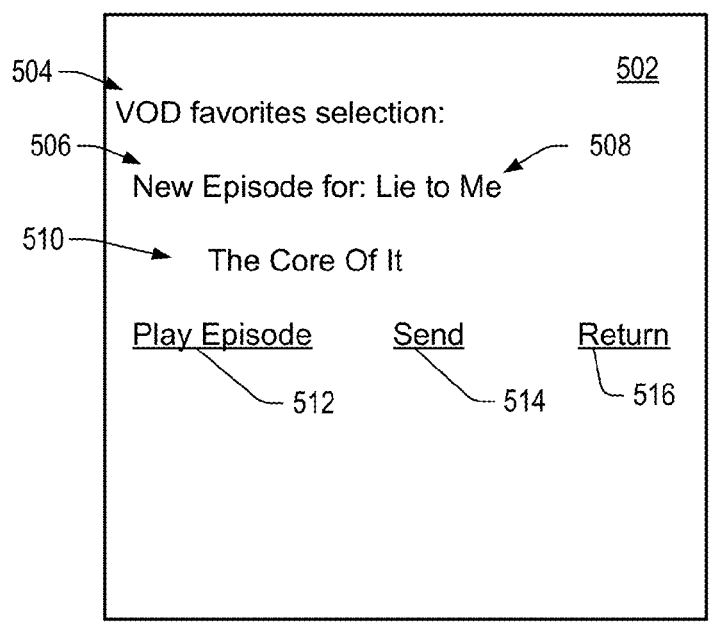
FIG. 5 depicts a second particular embodiment of a display to visually present a media service favorites list.

FIG. 5 depicts a second particular embodiment of a display 502 to visually present a media service favorites list. The display 502 may represent a display presented in response to a user choosing the "NE" indicator next to "Lie to Me" in the list of programs 406 of FIG. 4. The display 502 may include a first title 504 that indicates that the display 502 is related to a media service favorites list. The display 502 may include a second title 506 that indicates that the display 502 is showing new episodes for a particular program 508. The display 502 may include at least one new episode title 510 for the particular program 508. When more than one new episode title 510 is shown, the display 502 may include an option that allows the user to select a particular episode title. Selecting a particular episode title may highlight the particular episode title, place a check next to the particular episode title, or otherwise identify the particular episode title.

The display 502 may include a play selectable indicator 512. When the user of the display 502 selects the play selectable indicator 512, a new screen may be shown on the display 502 that allows the user to retrieve the new episode to the display 502. The display 502 may include a send selectable indicator 514. When the user of the display 502 selects the send selectable indicator 514, a new screen may be shown on the display 502 that allows the user to retrieve the new episode to another device designated by the user (e.g., a STB device, a computer system, or a DVR). The display 502 may include a return selectable indicator 516. When the user of the display 502 selects the return selectable indicator 516, the display 502 may return to a previous display (e.g., the display 402 shown in FIG. 4).

Figure 6:
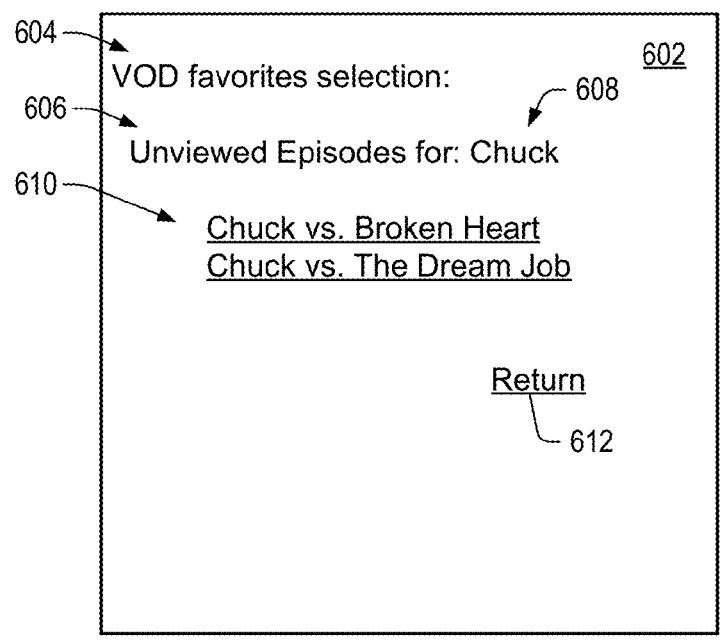
FIG. 6 depicts a third particular embodiment of a display to visually present a media service favorites list.

FIG. 6 depicts a third particular embodiment of a display 602 to visually present a media service favorites list. The display 602 may represent a display presented in response to a user choosing the "UE" indicator next to "Chuck" in the list of programs 406 of FIG. 4. The display 602 may include a first title 604 that indicates that the display 602 is related to a media service favorites list. The display 602 may include a second title 606 that indicates that the display 602 is showing unviewed episodes for a particular program 608. The display 602 may include at least one new selectable episode title 610 for the particular program 608. When more unviewed episodes exist than can be displayed on the display 602, the display 602 may include controls that allow the user to scroll through the displayed selectable unviewed episode titles 610 to view a desired portion of the episode titles 610. In some embodiments, the display 602 may initially show a list of selectable seasons instead of showing the unviewed episode titles 610. When the user selects a particular selectable season, the display may show the unviewed episode titles 610 for the season corresponding to the particular selectable season.

When the user selects a particular unviewed episode title 610, a new screen may be shown on the display 602. The new screen may allow allows the user to retrieve the unviewed episode from the media service to the display 602, may allow the user to send the unviewed episode from the media service to another device, or may allow the user to return to the display 602.

The display 602 may include a selectable indicator 612. When the user of the display 602 selects the selectable indicator 612, the display 602 may return to a previous display (e.g., the display 402 shown in FIG. 4).

Figure 7:
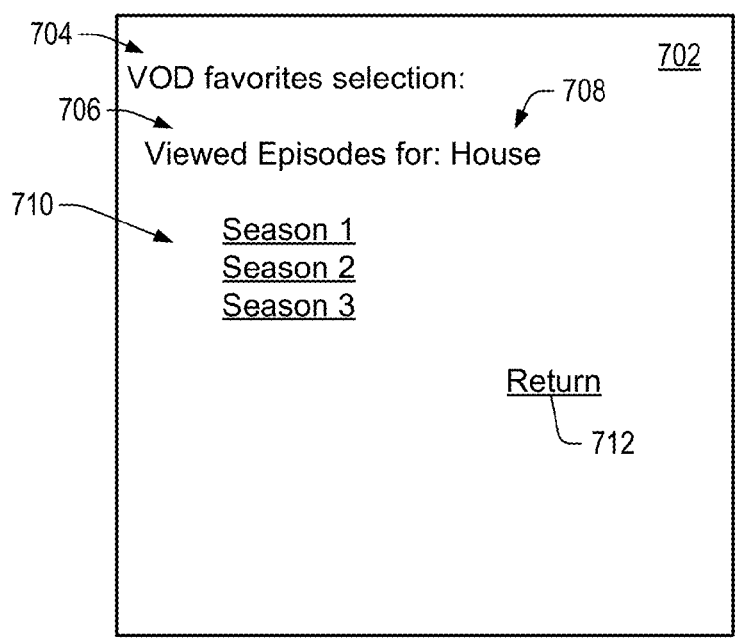
FIG. 7 depicts a fourth particular embodiment of a display to visually present a media service favorites list.

FIG. 7 depicts a fourth particular embodiment of a display 702 to visually present a media service favorites list. The display 702 may represent a display presented in response to a user choosing the "VE" indicator next to "House" in the list of programs 404 of FIG. 4. The display 702 may include a first title 704 that indicates that the display 702 is related to a media service favorites list. The display 702 may include a second title 706 that indicates that the display 702 is showing viewed episodes for a particular program 708. The display 602 may include at least one selectable identifier 710 for the particular program 708. The at least one selectable identifier 710 may indicate seasons (as shown) or may display viewed episode titles. When the selectable identifiers 710 are seasons, selection of a particular season may cause display of viewed episode titles for the selected season.

When the user selects a viewed episode title, a new screen may be shown on the display 702. The new screen may allow allows the user to retrieve the viewed episode from the media service to the display 702, may allow the user to send the viewed episode from the media service to another device, or may allow the user to return to the display 702.

The display 702 may include a selectable indicator 712. When the user of the display 702 selects the selectable indicator 712, the display 702 may return to a previous display (e.g., the display 402 shown in FIG. 4).

Embodiments disclosed herein facilitate selection of episodes of serial programs from a media service. The systems and methods may facilitate selection of programs from the media service by providing a media service favorites list that includes at least an indication when there is a new, unviewed episode of a favorite serial program. The systems and methods may also include indicators that indicate when there are unviewed episodes and viewed episodes of a serial program. The media favorites list may include both user selected favorites and recommended programs. The recommended programs may be provided to provide easy access to programs that may be of interest to the user based on one or more programs selected by the user. The systems and methods may promote the use of the media service. The system and methods may reduce the dependence on available memory of STB devices and DVRs by allowing the user to acquire desired media content from the media service. For example, the systems and methods may provide a recommendation for a program available from the media service that the user has repeatedly recorded on the DVR so that the user may free up the space needed to store the program on the DVR by viewing episodes of the program acquired from the media service via the media service favorites list.

Figure 8:
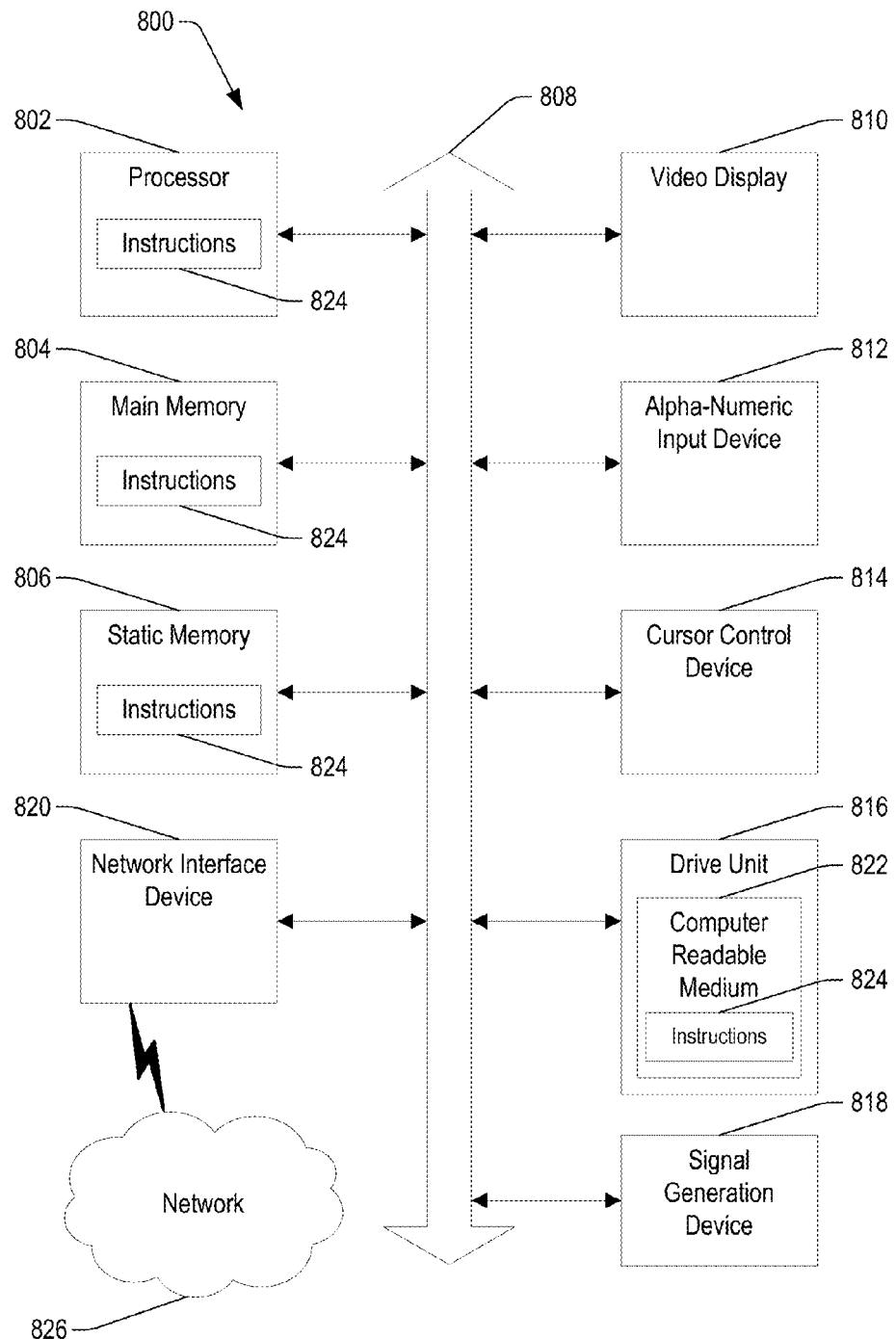
FIG. 8 is a block diagram of an illustrative embodiment of a general computer system.

Referring to FIG. 8, an illustrative embodiment of a general computer system is shown and is designated 800. The computer system 800 may include a set of instructions that can be executed to cause the computer system 800 to perform any one or more of the methods or computer based functions disclosed herein. The computer system 800 may operate as a standalone device or may be connected, e.g., using a network, to other computer systems or peripheral devices. For example, the computer system 800 may include or be included within any one or more of the media service 102, the network device 112, the database 120, and the devices 130-140 described with reference to FIG. 1.

In a networked deployment, the computer system 800 may operate in the capacity of a server or as a client user computer in a server-client user network environment, or as a peer computer system in a peer-to-peer (or distributed) network environment. The computer system 800 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 800 may be implemented using electronic devices that provide video, audio, or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 may include a main memory 804 and a static memory 806, which can communicate with each other via a bus 808. As shown, the computer system 800 may further include a video display unit 810, such as a liquid crystal display (LCD), a projection television system, a flat panel display, or a solid state display. Additionally, the computer system 800 may include an input device 812, such as a keyboard, and a cursor control device 814, such as a mouse. The computer system 800 may also include a disk drive unit 816, a signal generation device 818, such as a speaker or remote control, and a network interface device 820. Some computer systems 800 may not include an input device (e.g., a server may not include an input device).

In a particular embodiment, as depicted in FIG. 8, the disk drive unit 816 may include a computer-readable storage medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores instructions 824 or receives, stores and executes instructions 824 responsive to a propagated signal, so that a device connected to a network 826 may communicate voice, video or data over the network 826. Further, the instructions 824 may be transmitted or received over the network 826 via the network interface device 820.

While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. Accordingly, the disclosure is considered to include any one or more of a computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
retrieving a list of programs associated with at least one user at a computing device, wherein the programs in the list are available from a media service, and wherein the list comprises at least one first serial program selected by the at least one user and at least one second serial program selected by a recommendation engine;
determining, on a first date, whether each serial program in the list has a new and unviewed episode available from the media service, including:
determining a second date that an episode of the serial program was added to the media service;
determining that the episode is a new episode of the serial program in response to determining that a sum of the second date and a threshold number of days is later than the first date, wherein the threshold number of days corresponds to a frequency at which new episodes of the serial program are scheduled to be added to the media service;
determining whether the new episode is unviewed; and
sending from the computing device a display of the list to a display device associated with the computing device, wherein the display includes an entry for each program in the list and a first selectable indicator associated with each serial program determined to have a new and unviewed episode.

2. The method of claim 1, further comprising:
determining at the computing device whether each serial program in the list has an unviewed episode, wherein the display includes a second selectable indicator associated with each serial program in the list that has at least one unviewed episode;
wherein selection of a particular second selectable indicator by the at least one user causes a list of unviewed episodes for a particular serial program associated with the particular second selectable indicator to be displayed at the display device.

3. The method of claim 1, further comprising:
determining at the computing device whether each serial program in the list includes at least one viewed episode, wherein the display includes a second selectable indicator associated with each serial program in the list that has at least one viewed episode;
wherein selection of a particular second selectable indicator by the at least one user causes a list of viewed episodes for a particular serial program associated with the particular second selectable indicator to be displayed at the display device.

4. The method of claim 1, wherein selection of a particular first selectable indicator by the at least one user causes a title of each new episode of a particular serial program associated with the selected first selectable indicator to be displayed at the display device.

5. The method of claim 1, wherein the recommendation engine selects the at least one second serial program based on at least one viewing preference provided from a viewing history.

6. The method of claim 1, wherein the recommendation engine selects the at least one second serial program based on a television favorites list for the at least one user.

7. The method of claim 1, wherein the recommendation engine selects the at least one second serial program based on one or more programs that the at least one user has previously recorded to a digital video recorder.

8. The method of claim 1, wherein the recommendation engine selects the at least one second serial program based on a second list including the at least one first serial program and the at least one second serial program and wherein the second list is associated with a second user different from the at least one user.

9. The method of claim 1, wherein the display includes a visual distinction between the at least one first serial program and the at least one second serial program.

10. The method of claim 1, wherein the media service comprises a video on demand service.

11. A system comprising:
a processor; and
memory storing instructions executable by the processor to:
retrieve a list of programs from a communication device associated with at least one user, wherein the programs of the list are available from a media service, and wherein the list comprises at least one first serial program selected by the at least one user and at least one second serial program selected by a recommendation engine;
determine, on a first date, whether each serial program in the list has a new episode, including:
determining a second date that an episode of the serial program was added to the media service; and
determining that the episode is new in response to determining that a sum of the second date and a threshold number of days is later than the first date, wherein the threshold number of days corresponds to a frequency at which new episodes of the serial program are scheduled to be added to the media service; and
send the list to the communication device, wherein each serial program in the list that has a new episode is associated with a new episode indicator.

12. The system of claim 11, wherein the memory further stores instructions executable by the processor to:
receive a request to add a third serial program to the list;
add the third serial program to the list;
send information identifying the third serial program to the recommendation engine;
receive at least one recommended serial program from the recommendation engine based at least in part on the information identifying the third serial program; and
add the at least one recommended serial program to the list.

13. The system of claim 12, wherein the memory further stores instructions executable by the processor to send at least one user media preference to the recommendation engine, and wherein the at least one recommended program is selected based on the information identifying the third serial program and the at least one user media preference.

14. The system of claim 13, wherein the at least one user media preference includes a particular rating from a particular reviewer.

15. The system of claim 11, wherein the memory further stores instructions executable by the processor to request that the media service send a particular program selected from the list to a second communication device associated with the at least one user.

16. The system of claim 15, wherein the second communication device associated with the at least one user comprises a digital video recorder.

17. The system of claim 15, wherein the second communication device associated with the at least one user comprises a set-top box device.

18. A computer-readable storage device, comprising instructions that, when executed by a processor, cause the processor to perform operations including:
retrieving a list of programs associated with at least one user, wherein the programs in the list are available from a media service, and wherein the list comprises at least one first serial program selected by the at least one user and at least one second serial program selected by a recommendation engine;
determining, on a first date, whether each serial program in the list has a new and unviewed episode, including:
determining a second date that an episode of the serial program was added to the media service;
determining that the episode is new in response to determining that a sum of the second date and a threshold number of days is later than the first date, wherein the threshold number of days corresponds to a frequency at which new episodes of the serial program are scheduled to be added to the media service; and
determining whether the episode is unviewed; and
sending a display to a display device, wherein the display includes an entry for each of the programs in the list and a selectable indicator associated with each serial program determined to have a new and unviewed episode.

19. The computer-readable storage device of claim 18, wherein the display device is a computer monitor, a screen of a telephone, or a combination thereof.

20. The method of claim 2, wherein at least one serial program that has at least one unviewed episode is distinct from each serial program determined to have a new and unviewed episode.

* * * * *